United States Patent [19]

Brown et al.

[11] Patent Number: 5,351,036

[45] Date of Patent: Sep. 27, 1994

[54] MICROWAVE-BASED POINT LIQUID LEVEL MONITORING SYSTEM

[75] Inventors: David P. Brown, Brunswick; Michael J. Kett, Middleburg Hts., both of Ohio; Stephen P. Hebeisen, Salem, N.H.

[73] Assignee: Clark-Reliance Corporation, Strongsville, Ohio

[21] Appl. No.: 805,297

[22] Filed: Dec. 10, 1991

[51] Int. Cl.$^5$ ............................................. G08B 21/00
[52] U.S. Cl. ................................. 340/618; 73/290 R; 73/323; 342/124
[58] Field of Search ................ 340/618, 621; 342/124; 73/290 V, 323, 327, 334, 290 R; 367/93

[56] References Cited

U.S. PATENT DOCUMENTS

| | | |
|---|---|---|
| 2,676,265 | 4/1954 | Green . |
| 2,960,678 | 11/1960 | Beard et al. . |
| 3,111,581 | 11/1963 | Vollhardt . |
| 3,456,715 | 7/1969 | Freedman et al. . |
| 3,908,129 | 9/1975 | Akers . |
| 3,921,106 | 11/1975 | Williams . |
| 4,107,993 | 8/1978 | Shuff ............................ 73/290 R |
| 4,287,427 | 9/1981 | Scifres . |
| 4,440,022 | 4/1984 | Masom . |
| 4,668,945 | 5/1987 | Aldrovandi et al. . |
| 4,970,517 | 11/1990 | Williams . |
| 5,015,995 | 5/1991 | Holroyd . |

FOREIGN PATENT DOCUMENTS

| | | |
|---|---|---|
| 012311 | 6/1980 | European Pat. Off. . |
| 261860 | 3/1988 | European Pat. Off. . |
| 106807 | 9/1982 | Fed. Rep. of Germany . |

OTHER PUBLICATIONS

Saab TankRadar, Industrial Tank Gauging brochure.
AM Sensors, Inc., Specification MSM2000/MSM2002, Microwave Presence Sensors data sheet.
AM Sensors, Inc. data sheet for MSM10502, Range Gated Microwave Motion Sensor.
AM Sensors, Inc. data sheet for DR0102/DR0103, Planar Microwave Motion Sensors.
AM Sensors, Inc. data sheet for MSM10500, Continuous Range Gated Microwave Motion Sensor.
AM Sensors, Inc. sales literature MSM10200 Microwave Evaluation Kit.
Alphasensor, data sheet for Microwave Point Level Sensor MSM20100.
Alphasensor publication Williams, "Proximity Sensing Applications Using Microwave Technology".
Monitor Manufacturing Technical Information Bulletin No. 135A "Automate Your Materials Handling To Increase Productivity With Monitor Level/Solids Flow Systems".
Monitor Technical Information Bulletin 401A "Model SFD-1 Solids Flow Detector".
Monitor Manufacturing Technical Information Bulletin.
Williams, "The Basic Principles of Microwave Proximity Sensing".
"Radio-wave interface detector . . . ", Klaus Zanker, *Oil and Gas Journal*, vol. 82, No. 5, Jan., 1984, Tulsa, U.S.; pp. 150–152.
"Ultrasonic sensors solve a sticky problem", Radnor, *Instruments and Control Systems*, vol. 52, No. 6, Jun. 1979.

*Primary Examiner*—Jeffery A. Hofsass
*Attorney, Agent, or Firm*—Calfee Halter & Griswold

[57] ABSTRACT

A point liquid level monitoring system includes a sensor removeably mounted to a liquid level device. The sensor is designed to direct a microwave signal from a transmitter through a window in the liquid level device. In one embodiment, the microwave signal is reflected off a surface in the device opposite the window and collected by a receiver. In another embodiment, the microwave signal is collected by a receiver mounted onto a second window opposite the first window through which the microwave signal is transmitted. When liquid is present in the liquid level device at or above the level of the transmitter and receiver, the microwave signal is attenuated as it passes through the liquid. Sensor electronics compare the received signal to a predetermined threshold level and provide an output indicating the presence or absence of liquid at the transmitter/receiver level. The sensor can be easily installed or removed from the liquid level device without draining, depressurizing, or otherwise disturbing the operation of the device or attached fluid systems and, when installed, does not obstruct visually reading liquid levels in the device.

36 Claims, 8 Drawing Sheets

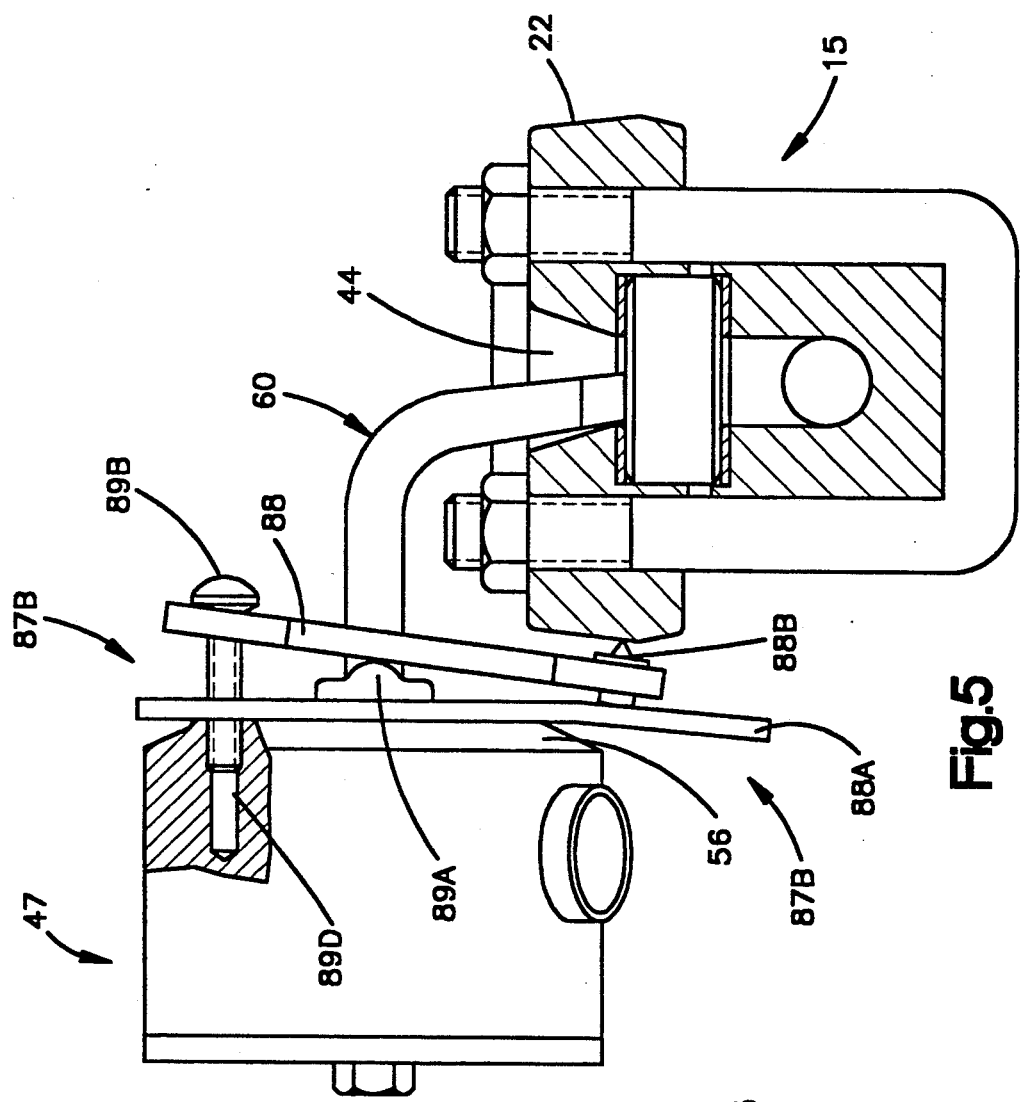
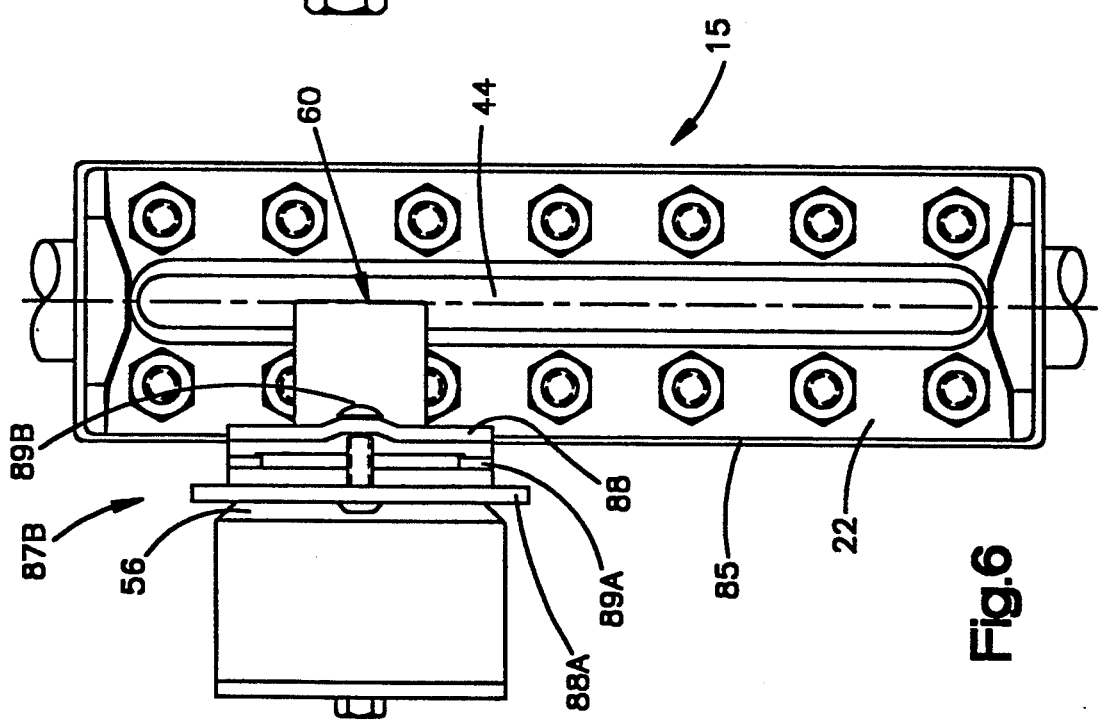

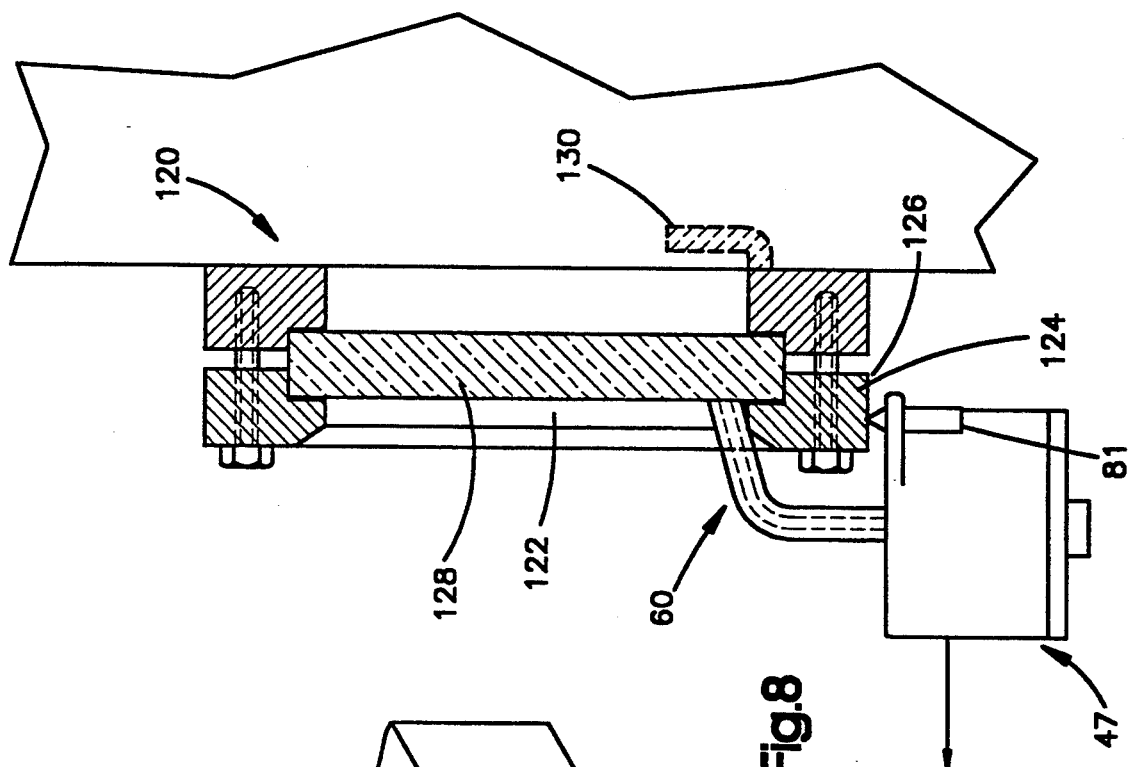
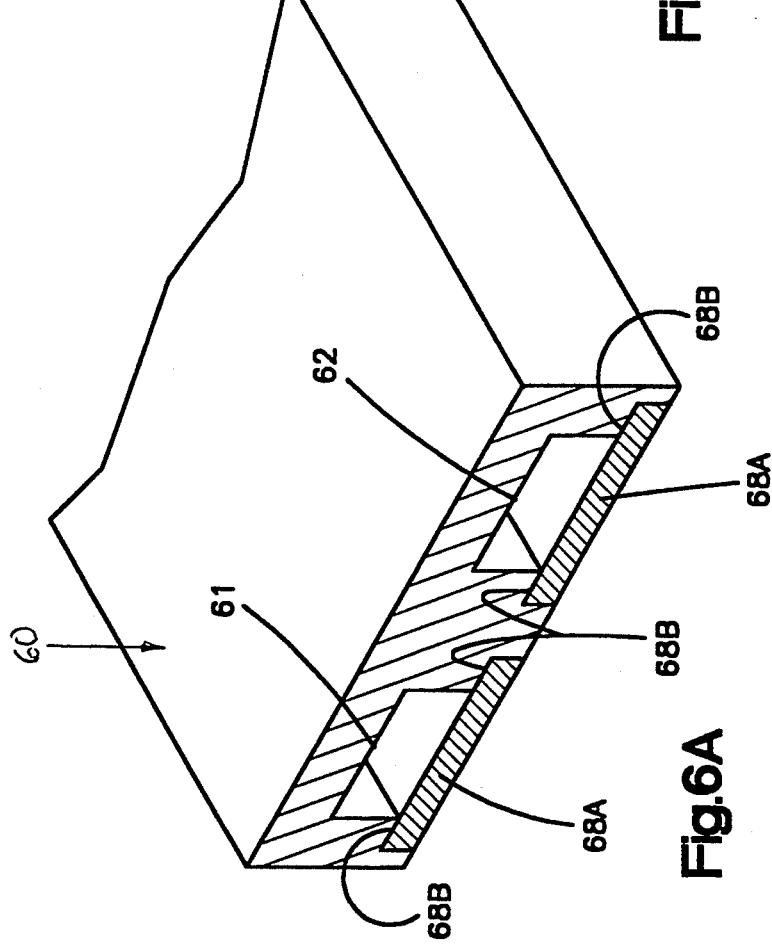

MICROWAVE-BASED POINT LIQUID LEVEL MONITORING SYSTEM

FIELD OF THE INVENTION

The present invention relates to a system for monitoring at least one point level of liquid in a liquid level gauge or other liquid level device.

BACKGROUND

In certain areas in a fluid system, it can be necessary to provide an indication of the level of liquid within the system. More particularly, it can sometimes be necessary to provide an indication of the level of liquid within a tank, vessel, pipe, or conduit within the fluid system. By knowing the liquid level, it can be determined whether remote apparatus (alarms, pumps, valves, etc.) should be activated, e.g., to increase or decrease the level of liquid within the fluid system.

A conventional liquid level device, also known as a "sight gauge", "sight glass", or "armored liquid level gauge", includes a cover clamped to a chamber. A window interposed between the cover and chamber allows visual inspection of the level of liquid in the chamber. The gauge can be fastened, e.g., bolted or welded, directly to the wall of a tank or vessel, or connected in parallel piping to a pipe or conduit. Graduations on the outer surface of the liquid level gauge around the window provide for visual measurement of the level of liquid within the device, and hence within the tank, vessel, pipe, or conduit.

However, conventional liquid level devices can have certain limitations under corrosive, hazardous, or other harsh environmental conditions. In particular, the window in the device can become corroded, rusted, or otherwise obscured, which decreases visibility through the window and thereby increases the difficulty in accurately measuring the level of liquid. Accordingly, certain liquid level systems have been developed which are not dependent on the visual inspection of the liquid within a liquid level device.

For example, one type of liquid level system is shown in Holroyd, U.S. Pat. No. 5,015,995. Holroyd discloses a first pair of transducers mounted on opposite sides of a tank in a vertically upper horizontal plane, and a second pair of transducers mounted on opposite sides of the tank in a vertically lower horizontal plane. Pulse generators send electrical pulses to transmitter transducers which transmit stress waves into the wall of the tank. The stress waves propagate peripherally through the walls of the tank and are detected by receiver transducers. The receiver transducers are connected to processors to analyze the amplitude of the detected stress waves and to determine if liquid is present or absent at either the upper or lower horizontal plane. The processors can operate alarms or valves to control the liquid level in the tank.

Similarly, Freedman, et al, U.S. Pat. No. 3,456,715, discloses electro-acoustic transducers arranged on opposite sides of a mold for molten metal which transmit and receive radiation through the mold. The measurements obtained from the detector transducer are indicative of the amount of radiation absorbed by the molten metal between the source transducer and the detector transducer—the absorption increasing when the molten metal reaches the level of the path connecting the two transducers.

Another type of liquid level system is shown in Beard, et al, U.S. Pat. No. 2,960,678. Beard discloses an ultrasonic level measuring apparatus having a transmitter and receiver mounted on the top of a tank. The transmitter is designed to transmit mechanical wave energy downward into the tank, where it is reflected off the interface between liquid in the tank and the substance above the liquid, and collected by the receiver. The receiver is connected to a control valve which regulates the height of the liquid in the tank.

Still another type of liquid level system is shown in Vollhardt, U.S. Pat. No. 3,111,581. Vollhardt shows a water level gauge having a radioactive source and a detector. The radioactive source is included within a float which rises and falls with the level of the water in the gauge. A variable-thickness baffle interposed between the source and the detector provides for increased radioactive transmission as the water level, and hence the float, rise; and decreased radioactive transmission as the water level falls.

Similarly, Green, U.S. Pat. No. 2,676,265, discloses a radioactive source located within a tube connected in-line with a fluid tank. A detector mounted on the top of the tube detects radiation produced by the radiation source. The radiation is attenuated depending on the level of fluid in the tube, and hence provides an indication of the level of fluid within the tank.

Other types of liquid level systems include a float which is designed to rise and fall with the level of liquid within a tank. The float can provide a visual indication of the level of liquid within the tank, or can be coupled to additional circuitry for an electronic output. Alternatively, capacitive or thermo-resistive elements can be located within the tank to provide an electronic signal proportional to the level of fluid within the tank.

The above-described liquid level systems are useful in determining the level of liquid within a tank, vessel, pipe, or conduit. However, these systems can also have certain limitations. For example, some tanks must be drained and/or depressurized, and their operation interrupted while the liquid level system is installed (or adjustably moved, removed, serviced, and/or replaced); while others can require apertures be formed in the tank and that certain parts of the liquid level system (e.g., the transmitter and/or receiver) be welded to the tank. For tanks containing hazardous, toxic, or flammable fluids, the installation of the liquid level system can be extensive, costly, and time-consuming, and precautions must be employed to safely perform the modifications. Accordingly, some of these systems do not have the flexibility to be simply and efficiently mounted (or adjustably moved, removed, serviced, and/or replaced) on an existing tank, vessel, pipe, or conduit.

Further, it is believed that some of these systems, in particular the systems with acoustic or ultrasonic transducers, are susceptible to dust, dirt, and moisture which can make them unacceptable for harsh environmental conditions. Additionally, some systems must be acoustically coupled to the tank and can be dependent upon the particular liquid employed.

One known type of liquid level system which has overcome some of the above-described limitations provides transmitters and receivers using microwave signals to determine the liquid level in a tank. The microwave transmitters and receivers are non-contact and can transmit and receive microwave signals through sealed windows to determine the content height in the tank. The microwave signals are generally immune to airborne contaminants such as dust, dirt, and moisture and can operate through large thermal gradients.

The transmitter for this one type of microwave system typically includes an oscillator, a mixer diode and an antenna. A portion of the microwave signal generated by the oscillator is coupled to the mixer diode. The antenna focuses the remainder of the signal on the target, which reflects a portion of the signal to the mixer. During transmission, a frequency modulation is applied to the oscillator usually in a triangular, sawtooth, or sinusoidal fashion. The mixer then combines the source and return signals, generating an output frequency which is a function of the frequency difference between the two signals. The frequency relationship is, in turn, a function of the distance from the transmitter to the target. As the target moves with respect to the transmitter, the distance changes as well as the output from the mixer. One such system is manufactured by Saab Tank Control of Gothenburg, Sweden.

Although the Saab system illustrated above provides certain advantages for measuring the level of liquid within a large tank, the transmitter and receiver are relatively large, bulky, and expensive units which must be mounted within openings formed in the roof of the tank. Accordingly, the Saab system, like the other liquid level systems described above, requires that the integrity and operation of the tank be compromised. Additionally, it is believed that the bulkiness of the Saab transmitter/receiver combination prevents these units from being used with a liquid level device such as a liquid level gauge. Specifically, the liquid level gauge has a relatively small window area in which to direct and receive microwave signals, the surrounding metal housing of the liquid level gauge being unacceptable for microwave transmission. It is believed that the transmitter/receiver units of the Saab system are far too large and bulky to provide an accurate determination of the liquid level within the liquid level gauge.

All of the above-mentioned liquid level monitoring systems, and it is believed nearly all presently available liquid level monitoring systems, require expensive, costly, and time-consuming varying of the liquid level in the tank, vessel, pipe, or conduit to directly visually calibrate, test, and verify the functional operation of the liquid level monitoring system. Also, it is believed that such visual direct validation is normally accomplished by reading installed sight glasses or liquid level gauges.

SUMMARY

The present invention provides a new and useful system for monitoring the point level of liquid in a liquid level device (e.g., a liquid level gauge, sight glass, or sight gauge). The system operates under harsh environmental conditions and can be easily mounted onto and removed from an existing liquid level device without draining, depressurizing, or otherwise disturbing the operation of the device or the attached fluid systems. Moreover, the liquid level system allows simultaneous visual inspection and confirmation of the liquid level within the liquid level device.

According to one aspect of the invention, the point liquid level monitoring system includes a sensor removeably mounted to the liquid level device. The sensor includes a pair of waveguide channels, with one channel connected to a transmitter and the other channel connected to a receiver. The transmitter provides a low-power microwave signal into the transmitter waveguide channel which is directed down the channel and through a window in the liquid level device. The signal is reflected off a surface of the device opposite from the window, and directed up through the receiver waveguide channel to the receiver. The transmitter and receiver of the sensor have a small footprint within the window which allows simultaneous visual inspection and confirmation of the liquid level within the liquid level device.

According to another aspect of the invention, a sensor having a transmitter and waveguide channel is mounted to a window on one side of the liquid level device, and a sensor having a receiver and waveguide channel are mounted to a window on an opposite side of the liquid level device. The transmitter sensor and receiver sensor each have a small footprint within the window which allows simultaneous visual inspection and confirmation of the liquid level within the liquid level device.

When liquid is present within the device at or above the level of the transmitter and receiver, the microwave signal is attenuated as it passes through the liquid. Sensor electronics connected to the receiver compare the signal collected in the receiver to a predetermined threshold level. The sensor electronics communicate with control electronics to selectively activate remote apparatus (alarms, valves, pumps, etc.), e.g., to control the level of liquid within the tank, vessel, pipe, or conduit.

According to another aspect of the invention, pairs of transmitters and receivers are mounted at selected vertical heights on the liquid level device. The pairs of transmitters and receivers detect the level of liquid within the liquid level device at more than one predetermined level. The additional transmitters and receivers are also connected to the sensor electronics to provide selected control of remote apparatus at the different liquid levels.

One of the advantages of the present invention is that the microwave transmitter and receiver can be simply and efficiently mounted to an existing liquid level device without draining, depressurizing, welding/soldering, or otherwise disturbing the operation of the device or the attached fluid systems.

Another advantage of the present invention is that the position of the transmitter and receiver, and hence the liquid level measurement point, can be widely and continuously adjusted without draining, depressurizing, welding/soldering, or otherwise disturbing the operation of the device or the attached fluid systems.

Another advantage of the present invention is that the transmitter and receiver, together, have a small footprint on the window of the liquid level device, which allows simultaneous visual inspection of the liquid level through the window of the liquid level device.

Another advantage of the present invention is that the functional operation of the liquid level monitoring system may be directly and completely tested, calibrated, and verified visually through the window in the device without varying the level of the liquid in the tank, vessel, pipe, or conduit.

Still another advantage of the present invention is that the point liquid level monitoring system can be used under harsh environmental conditions where extreme temperatures, corrosion, dirt, dust, etc. are present, to obtain an accurate reading of the point level of liquid within the liquid level device.

Other advantages of the present invention will become more apparent from the following detailed description and the accompanying drawings which form a part of the specification.

BRIEF DESCRIPTION OF THE DRAWINGS

FIG. 5 is a partial sectional bottom view of the liquid level gauge similar to FIG. 3;

FIG. 6 is a front, enlarged view similar to FIG. 2, but showing the clamp assembly of FIGS. 3 and 5 removeably mounting the sensor to the liquid level gauge;

FIG. 6A is a sectional isometric end view of an additional form of waveguide channel for the sensor of FIG. 2;

FIG. 8 is a side view of the sensor of FIG. 1, but showing the sensor mounted on a sight gauge or sight window, shown in section, covering a tank opening.

DETAILED DESCRIPTION OF THE PREFERRED EMBODIMENT

Figure 1:
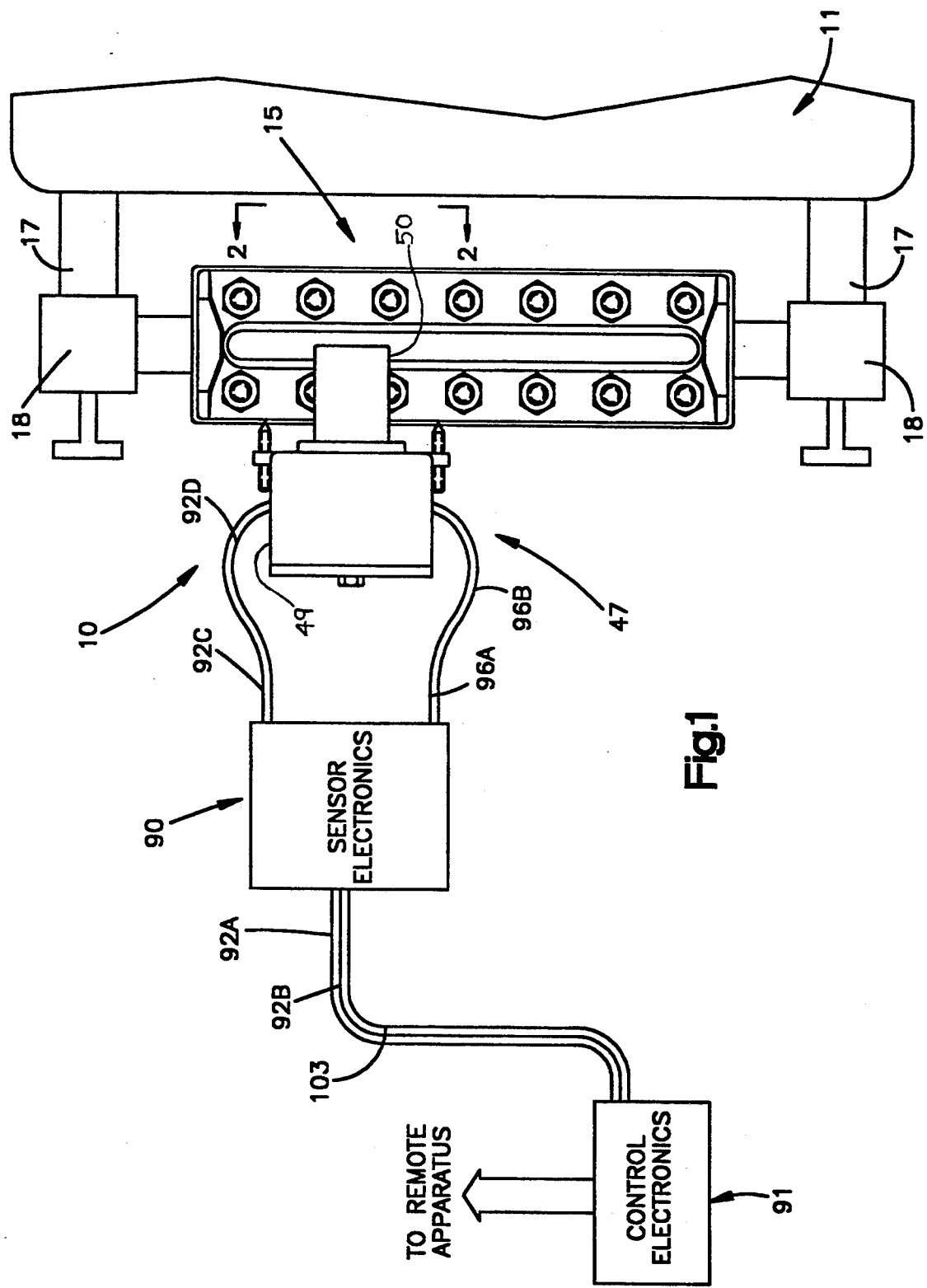
FIG. 1 is a schematic illustration of the point liquid level monitoring system showing the control electronics, sensor electronics and sensor, the sensor being removeably mounted to a liquid level gauge attached to the side of a tank.

Referring to the drawings, and initially to FIGS. 1–4, a point liquid level monitoring system is indicated generally at 10 which provides an indication of the point level of liquid within a fluid system. The fluid system can include a tank, for example as indicated generally at 11, or can include a vessel, pipe, conduit, or other conventional liquid-containing apparatus, as is known in the art.

A liquid level device, indicated generally at 15, is connected within the fluid system. The liquid level device can be connected directly to the wall of a vessel or tank, or connected in-line within a pipe or conduit, as is generally known in the art. For purposes of illustration, the liquid level device 15 can be connected in-line between inlet and outlet pipes 17. Pipes 17 can include valves 18 and can be connected directly to the tank 11. In any case, the liquid level device provides a visual indication of the level of liquid within the fluid system.

Preferably, the liquid level device 15 shown is of the type which is commonly referred to as a "reflex" gauge. This type of gauge generally includes a metal cover 22, a metal chamber 26, and metal U-bolts 30. Each U-bolt 30 includes a pair of threaded ends 32 which are received within bores 36 formed in cover 22. Nuts 33 are drawn down on threaded ends 32 to couple the chamber 26 to the cover 22.

A tempered glass window 38 is interposed between the chamber 26 and a shoulder 40 formed in the cover 22. Window 38 encloses a channel 41 formed longitudinally within the chamber 26 which is connected to the vessel or tank, or in-line with pipes or conduits. Appropriate gaskets and/or cushions, for example as indicated at 42, are provided between the window 38 and the cover 22, and between the window 38 and the chamber 26 to provide a fluid-tight seal within the gauge.

An aperture 44 is formed longitudinally along at least a portion of the cover 22. The aperture 44 is defined by opposing walls 45, 46 formed in cover 22 which generally taper inward toward the window 38. The aperture 44 enables visual inspection of the channel 41 in the gauge through the window 38. A preferred "reflex type" liquid level gauge is manufactured by Jerguson Gauge & Valve Co., a division of the Clark-Reliance Corporation, Strongsville, Ohio, under the model number 17R-20; however, it is believed that this invention is appropriate for any type of liquid level device, such as a sight gauge, sight glass, weld pad type sight window, or other liquid level device which has a window for visually inspecting the level of liquid (or liquid flow) within a container.

Referring again to FIGS. 1-4, the point liquid level monitoring system 10 for the liquid level device 15 includes a sensor, indicated generally at 47, having an electronics housing portion, indicated generally at 49, and a waveguide housing portion, indicated generally at 50. A transmitter, indicated generally at 51 and a receiver, indicated generally at 52, are mounted within the electronics housing portion 49. The transmitter 51 and receiver 52 are designed to transmit and receive microwave signals through the window 38 in the liquid level device 15 to determine the presence or absence of liquid in the device at the sensing level "L", as will be described herein in more detail.

The waveguide housing portion 50 and electronics housing portion 49 for the sensor 47 are preferably formed, e.g., cast, in one piece from metal or other conductive material. The waveguide housing portion 50 includes a base plate 56 and a neck portion, indicated generally at 60, extending outwardly from the base plate 56. The neck portion 60 of the waveguide housing 50 is curved from the base plate 56 to the outer end 67 (see e.g., FIG. 3) at approximately an 82° angle to form a C-shaped clamp, as will be described herein in more detail.

Figure 2:
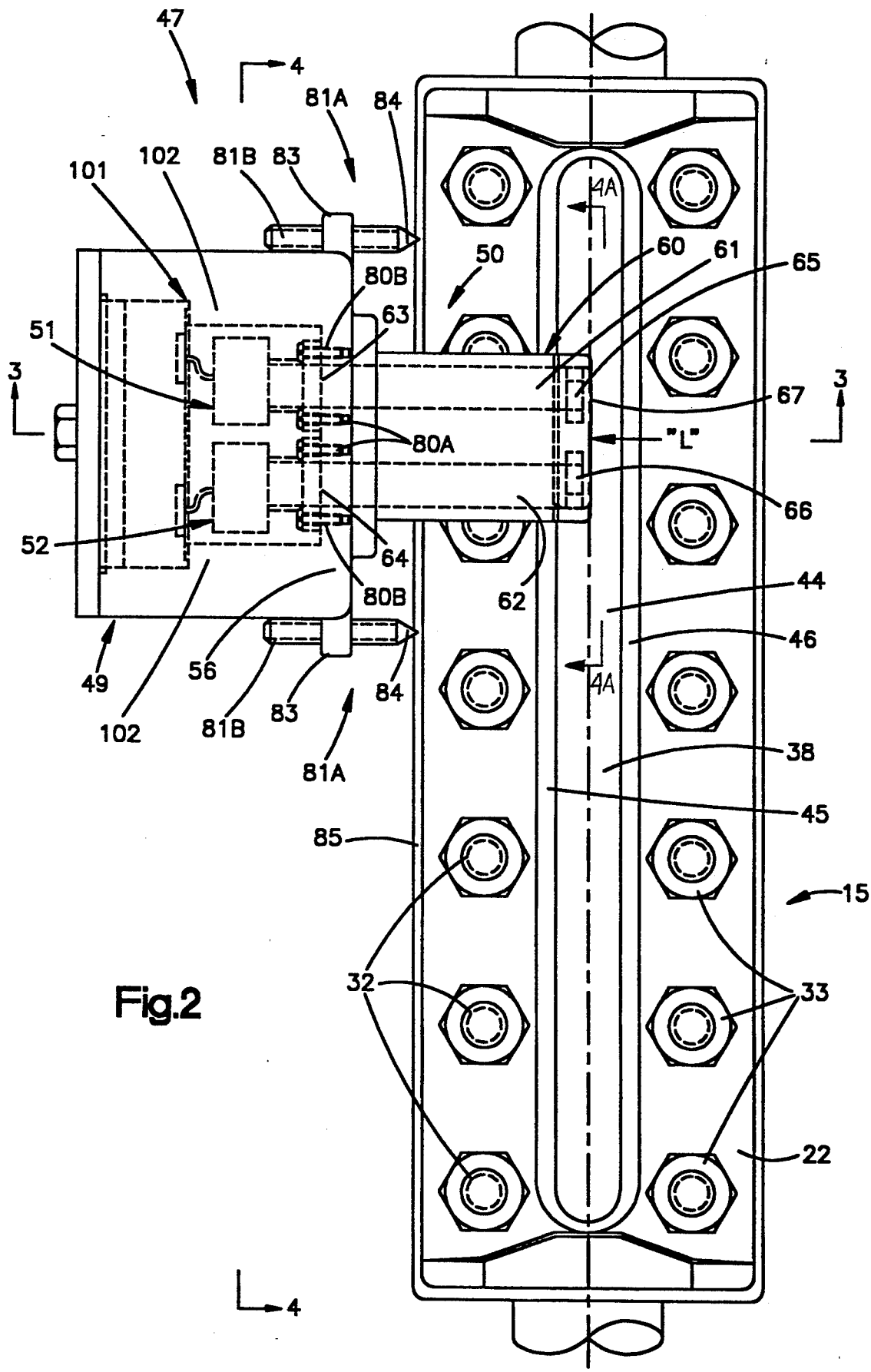
FIG. 2 is a front, enlarged view of a liquid level gauge showing the sensor removeably coupled to the gauge.
Figure 3:
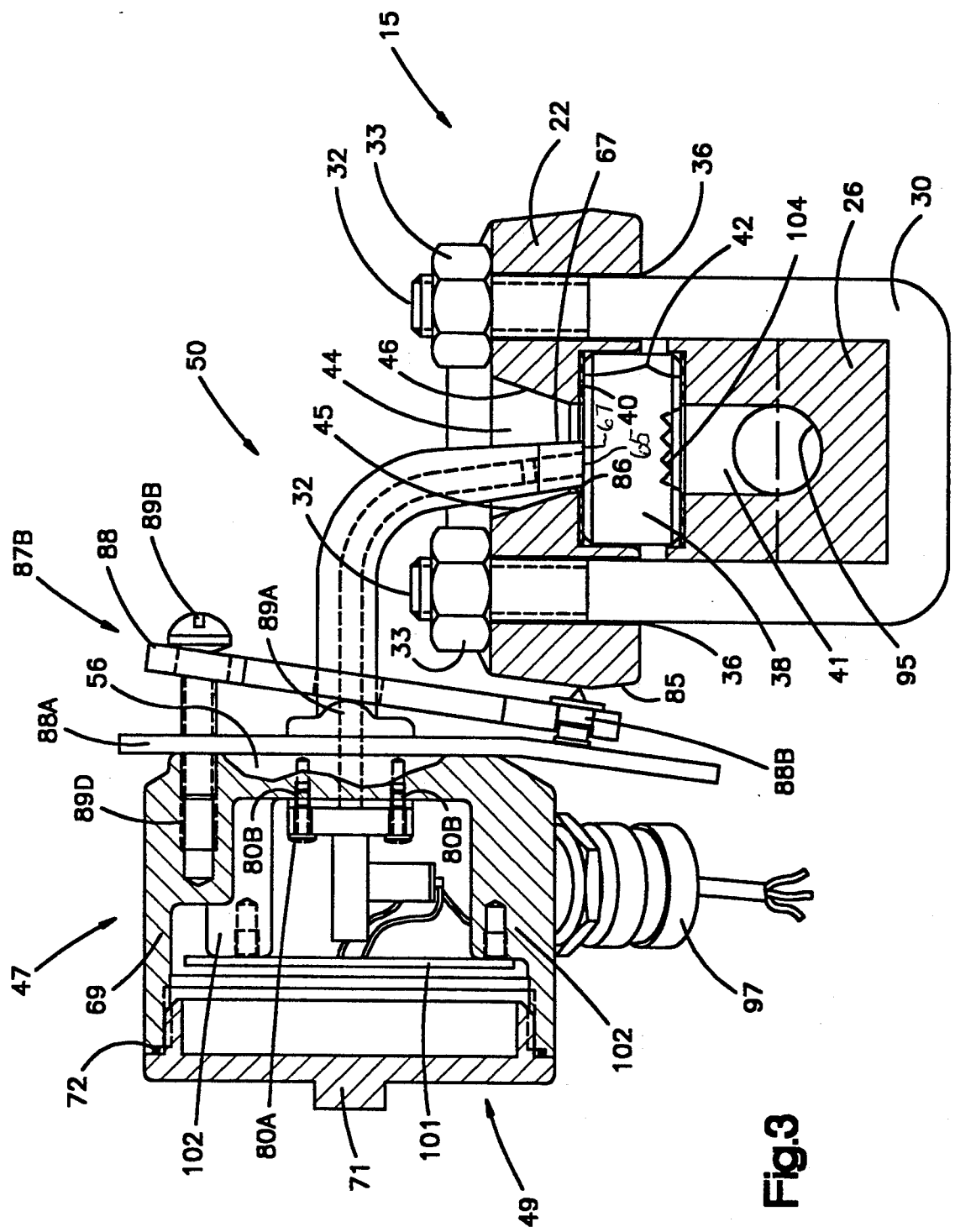
FIG. 3 is a sectional bottom view of the liquid level "reflex" gauge and sensor taken substantially along the plane described by the lines 3—3 of FIG. 2 but showing an additional embodiment of the invention using a clamp assembly for removeably coupling the sensor to the liquid level gauge.
Figure 4:
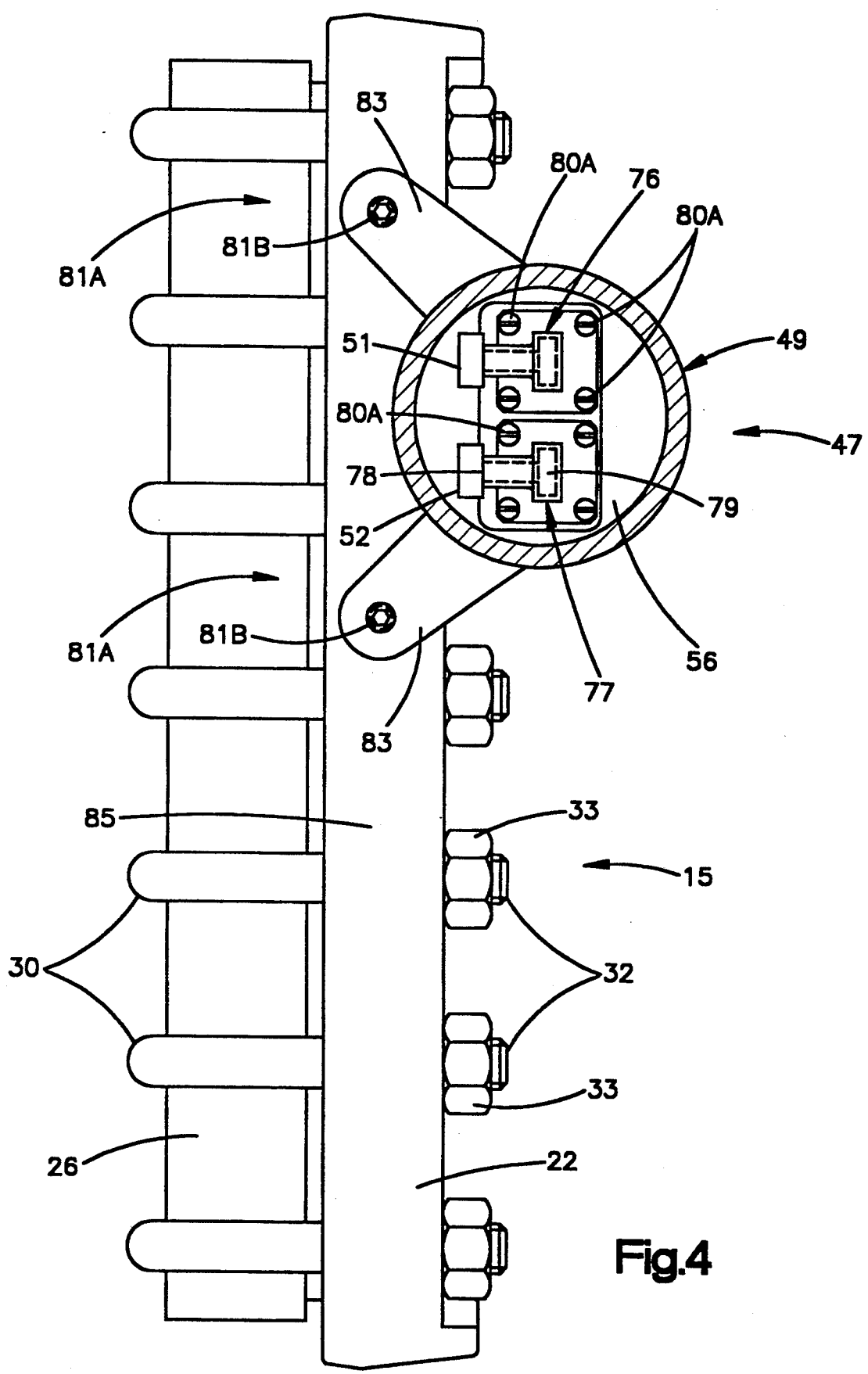
FIG. 4 is a sectional side view of the sensor mounted on the liquid level gauge taken substantially along the plane described by the lines 4—4 of FIG. 2.
Figure 4A:
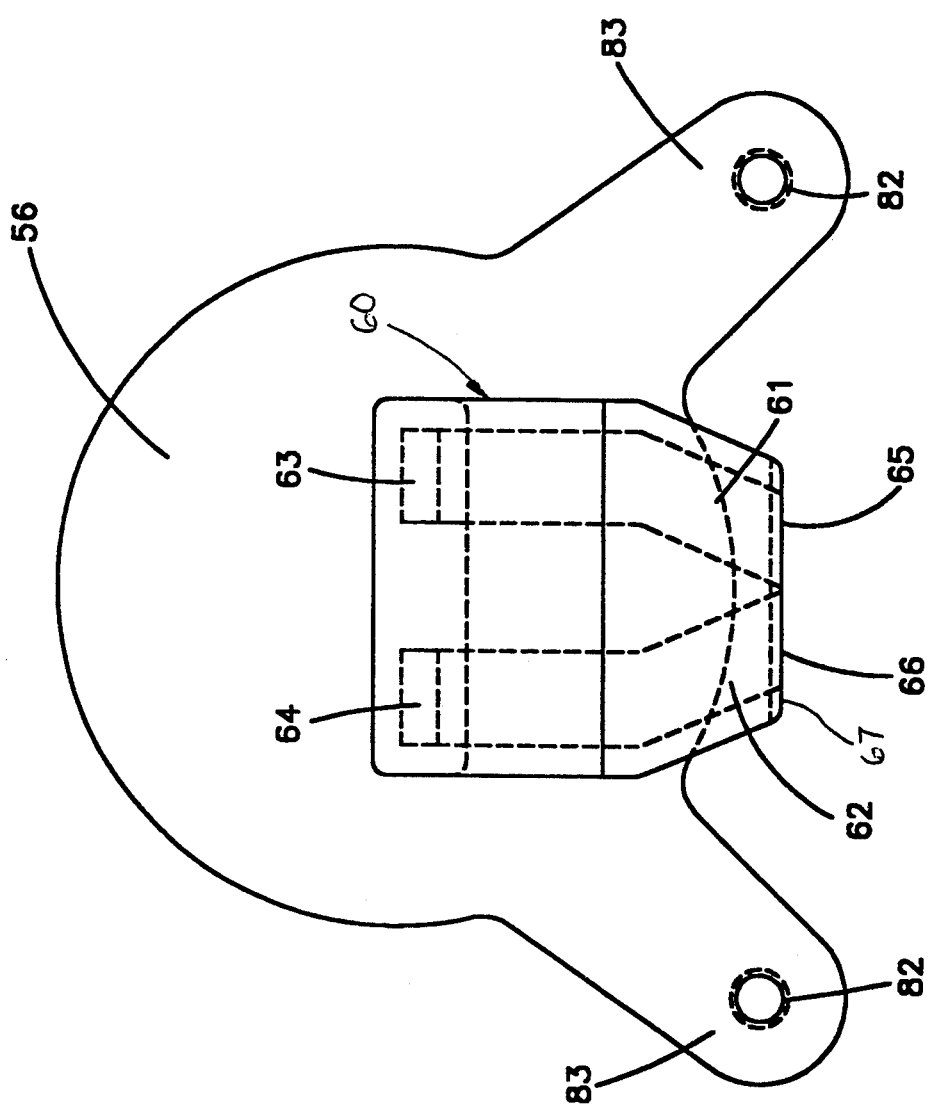
FIG. 4A is a right side view of the sensor taken substantially along the plane described by the lines 4A—4A of FIG. 2, with the liquid level device removed for clarity.

Referring now to FIGS. 2, 3, and 4A, the neck portion 60 includes first and second waveguide channels 61, 62. The waveguide channels 61, 62 interconnect openings 63, 64 in base plate 56 with openings 65, 66, respectively, in the outer end 67 of neck portion 60. The waveguide channels 61, 62 preferably comprise fully-enclosed, conductive conduits; however, the waveguide housing can also be formed from non-metallic, non-conductive material. In this case, the waveguide channels can be coated by plating with conductive materials such that the microwave signals are properly transmitted through the waveguide channels. Alternatively, the waveguide channels can be only partially enclosed by the waveguide housing, for example as shown in FIG. 6A. In this case, a thin sheet or sheets of metal strip or foil 68A can be conductively bonded by welding, brazing, or conductive adhesive (such as epoxy) onto the shoulders 68B formed along the length of the channels to completely and conductively enclose each channel. In any case, the waveguide channels 61, 62, extend in substantially parallel relation within waveguide housing 60. At least one, and preferably both, of the waveguide channels are angled inwardly near the outer end 67 at approximately 25° to provide for proper transmission and collection of the microwave signals.

The openings 65, 66 of channels 61, 62 can be protected with a microwave-transparent sealant and a Kapton sheet end protector (not shown). To this end, the sealant can be inserted within the openings 65, 66 and can act as a bonding agent for the Kapton sheet, which can be applied across the outer end 67 of the neck portion. The sealant and Kapton sheet prevent unwanted dirt, dust, chemicals, etc. from entering the openings, and prevent the outer metal end 67 of the waveguide housing from scratching the window of the liquid level device.

Referring now to FIG. 3, the base plate 56 of the waveguide housing portion 50 also serves as the base wall of the electronics housing portion 49. The electronics housing portion 49 includes a main compartment formed by side wall 69 connected to base wall 56. A cover 71 is removeably mounted to side wall 69 by a threaded connection or by fastening with screws. An O-ring 72 is interposed between cover 71 and sidewall 69 to seal the cover to the electronics housing portion. Although the electronics housing portion and waveguide housing portion of the sensor are shown as one piece, it is to be appreciated that the two housing portions can also be formed, e.g., cast, separately and fastened together.

The electronics housing portion 49 of the sensor encloses a pair of T-shaped waveguides, indicated generally at 76, 77 (FIG. 4). The T-shaped waveguides are designed to direct a microwave signal into and out of waveguide channels 61 and 62, respectively. For example, T-shaped waveguide 77 includes an outlet 78 coupled to the receiver 52 and an inlet 79 coupled to channel 62. The T-shaped waveguide 77 directs microwave signals received in channel 62 to receiver 52. T-shaped waveguide 76 is similarly situated with transmitter 51 to direct microwave signals from transmitter 51 down through microwave channel 61. It should be appreciated, however, that the positioning of the transmitter and receiver, and hence the functioning of the waveguide channels, could be reversed without affecting the overall performance of the sensor. Each T-shaped waveguide is preferably formed from metallic, conducting material and can be mounted to the base plate 56 of the waveguide housing using screws 80A received in threaded bores 80B (FIGS. 2,3) formed in the base plate 56.

According to an alternate form of the invention, it is believed that transmitter 51 could also comprise a microstrip, or stripline design from which a microwave frequency, electromagnetic energy generator is established for transmission into a liquid level gauge. Additionally, waveguide receiver 52 could also comprise a microstrip or stripline embodiment in order to produce a receiver tuned for operation at the microwave frequency set for transmitter 51. In this case, the transmitter and receiver would then transmit and receive microwave signals directly through the window(s) in the liquid level device. In accordance, the corresponding antennas need not be restricted to the waveguide approach detailed herewith channels 61 and 62. They could respectively be realized within a microstrip "patch antenna", or stripline approach; and if necessary a "C-Clamp" structure similar to that resembled by waveguide housing portion 50 could be utilized for structural support of the alternate realizations in addition to functioning as a clamping structure.

According to one embodiment of the present invention, the sensor 47 is removeably mounted to the liquid level device 15 using an adjustable screw assembly, indicated generally at 81A in FIGS. 2 and 4. The screw assembly 81A includes a pair of adjustable screws 81B which are received within a pair of bores 82 (FIG. 4A) formed in extensions 83 protruding from opposite sides of base plate 56.

To mount the point liquid level monitoring system to the liquid level device, the neck portion 60 is initially inserted within the aperture 44 formed in the cover of the liquid level device. The C-shaped clamp shape of the waveguide housing 50 can be hooked on a wall 45 (or 46) making up the aperture 44 of the liquid level gauge. The sensor housing is then located toward the side of the liquid level device and the screws 81B are tightened down against the side 85 of the cover 22 to cause screw end points 84 to "bite" into the outer surface, e.g., the side 85 of cover 22. A "compression" mounting is achieved between screws 81 and the outer end 67 of the waveguide housing to mount the sensor 47 to the liquid level device 15. A lip 86 (see e.g., FIG. 3) can be formed with outer end 67 of the waveguide housing to "bite" into the gasket 42 between the window 38 and the cover 22 to facilitate hooking the sensor to the liquid level device.

It is believed that the C-shaped design of the neck portion enables the sensor 47 to be coupled (or adjustably moved, removed/serviced, and/or replaced) on a wide variety of commercially-available liquid level devices at any selected vertical location along the window of the device. More particularly, the C-shaped design of the neck portion 60 is believed to: (i) minimize obstructing the view of the window 38 (i.e., forms a small "footprint" in the window) because only about half of the window is obstructed at the level of the sensor, (ii) have sufficient clearance to extend around the cover 22, (iii) have sufficient strength to couple the sensor 47 to the liquid level device 15, and (iv) provide a smooth passage for the transmission of microwave signals through the waveguide channels 61, 62. The sensor can, of course, be easily removed from the liquid level device by simply loosening screws 81B.

According to another embodiment of the invention, as illustrated in FIGS. 3, 5 and 6, the sensor 47 can be removeably mounted to the liquid level device 15 using a clamp assembly, indicated generally at 87B, rather than the adjustable screw assembly described previously. The clamp assembly 87B includes a pivoting clamp plate 88 which is pivotable about a ridge-shaped fulcrum 89A formed on base plate 56. The pivoting clamp plate 88 includes a rectangular slot (not numbered) through which the neck portion 60 extends to allow unobstructed pivoting of the clamp plate. A heat shield 88A, with a rectangular slot cut-out from its midsection, can be placed over neck portion 60 and located around ridge-shaped fulcrum 89A to protect the sensor electronics 90 (from FIG. 1) from heat energy radiated from liquid level device 15.

To mount the sensor 47 to the liquid level device 15, the C-shaped neck portion 60 is again located within the aperture 44 of the liquid level device and a jack screw 89B is drawn down through a hole (unnumbered) formed in base plate 56 of the sensor and into a tapped bore 89D. Drawing down screw 89B brings one end of pivoting clamp plate 88 toward the base plate 56, which causes the other end of the pivoting clamp plate 88 to pivot outwardly from the housing around fulcrum 89A, and into contact with the outer surface 85 of cover 22. The pivoting clamp plate 88 includes a pin 88B with a pointed head which "bites" into the outer surface of the cover to securely mount the sensor to the liquid level device. The sensor, of course, can be removed from the liquid level device by simply loosening screw 89B in the clamp assembly.

It is believed that the clamp assembly described above provides an additional feature in that clamp plate 88 tends to bend when jack screw 89B is over-tightened. The bending of clamp plate 88 prevents the waveguide housing 60 from bending and the waveguide channels in the waveguide housing from becoming misaligned with respect to the window in the liquid level device. If the waveguide channels become misaligned, it is possible that the microwave signal would not be properly transmitted through the window in the liquid level device and received by the sensor. If the clamp plate becomes bent through overtightening, the sensor can be removed from the liquid level device and a new clamp plate attached, or the old clamp plate can be bent back into a substantially planar orientation. In any case, the clamp plate prevents damage to the other components of the sensor because of overtightening.

Regardless of which mounting method described above is used, the electronics for the sensor are as follows. The transmitter 51 and receiver 52 are electrically connected with sensor electronics 90 (See FIG. 1) and control electronics 91 to determine the point level of the liquid in the device. More particularly, transmitter 51 preferably comprises a Gunn Diode device that emits 24.125+/−0.050 GHz, approximately 1 mW power, electromagnetic energy into T-shaped waveguide 76 and into the transmitter waveguide channel 61. This is an FCC acceptable frequency/power range for such microwave devices. Control electronics 91 (or other power supply means) provide (i) a ground potential on conductor 92A; (ii) a 10 volt filtered DC signal on conductor 92B; (iii) and a communication line 103 which varies between 10 volts DC and approximately ground depending on whether the level of the liquid is below point "L" or above point "L" respectively. The sensor electronics 90, in turn, regulate and low-pass filter the power supply fed over conductors 92A and 92B, and create a 5 VDC square wave modulation on conductor 92C to drive the Gunn Diode device to oscillate at the required microwave frequency at a modulated/coded rate of approximately 2 KHz. The sensor electronics also provide a ground to the Gunn Diode device across wire 92D. In the case where transmitter 51 utilizes a microstrip "patch" antenna or stripline antenna to direct its energy, an additional connection from the transmitter would have to be made to the respective antenna in order to emanate the developed microwave radiation through the antenna and into the liquid level device. This connection could, for instance, be realized with a coaxial conductor (not shown).

When the microwave transmitter 51 generates a microwave signal, the microwave signal travels through T-shaped waveguide 76, down through transmitter waveguide channel 61, and out through the opening 65 formed in the outer ends 67 of the neck portion 60. The waveguide channel 61 directs the microwave signal through the window 38 in the liquid level gauge. The microwave signal then strikes surface 95 (FIG. 3) of the channel 41 opposite from window 38. Surface 95, being metal for a "reflex" gauge or a glass/non-conductive material for a "transparent sightglass", reflects the microwave signal back through window 38 when no liquid is present at the sensing level "L" of the transmitter. Alternatively, a microwave "resonant cavity" measurement method may be employed. In any case, the signal is reflected up through the receiver waveguide channel 62, through T-shaped waveguide 77, and to receiver 52.

The receiver 52 is preferably a Shottky detector diode that detects returned microwave energy and converts the energy into a DC amplitude dependent on signal strength. If liquid is present within the sightglass channel at the height of receiver waveguide channel 62, the transmitted energy is absorbed/attenuated by the liquid and very little energy is converted to a voltage. However, if the liquid level is below waveguide channel 62 then enough energy is detected by receiver 52 to produce a detectable DC amplitude. The receiver 52 is connected to the sensor electronics 90 via two conductors: i) a ground conductor 96A, and ii) a signal conductor 96B that conveys the output signal to the sensor electronics 90. In the case where the receiver 52 includes a micro-strip "patch antenna" or stripline antenna to receive the transmitter's energy, an additional connection from the antenna would be made to the receiver in order to provide a path for the microwave energy to reach the receiver diode. This connection could, for instance, be realized with a coaxial conductor (not shown).

The electrical components in the sensor electronics are designed to amplify the signals received from the Schottky diode, and first compare the pattern of these signals to the 2 KHz modulation signal applied to the Gunn diode transmitter 51 in order to initially confirm that the microwave energy received was transmitted by the respective oscillator. Secondly, the electronics compare the level of this received modulation to a threshold value in order to determine whether the liquid level within the liquid level gauge has increased above the sensing level "L". If the liquid level has covered or exceeded the height of either waveguide channel 61 or 62, the received energy is lower than the threshold. Alternatively, if the liquid level is below both of the waveguide channels, the received energy level is higher than the threshold. The threshold level can be easily adjusted during initial calibration of the point liquid level monitoring system.

For illustration purposes, the sensor electronics 90 in FIG. 1 are shown separate from the electronics housing 49 of sensor 47. However, in practice, the sensor electronics 90 are located within the electronics housing 49 of the sensor 47, as shown in FIGS. 2 and 3, and are preferably mounted on a conventional circuit board, indicated generally at 101. Circuit board 101 is, in turn, mounted on bosses 102 formed in electronics housing 49.

The sensor electronics 90 provide an output voltage to the control electronics 91, remote PLC, or other control system indicating whether liquid is present or absent at the transmitter/receiver level (i.e., the sensing level) in the gauge. More particularly, the output from the sensor electronics 90 is applied to the control electronics 91 via conductor 103 which, along with conductors 92A and 92B, pass through an opening in fitting 97 (FIG. 3) attached to electronics housing portion 49. Electrical conductor 103 is a signal wire which provides a 0 VDC signal from sensor electronics 90 to the control electronics 91 when liquid is present at or above the sensor level, and a 10 VDC signal to the control electronics 91 when liquid is absent at the sensor level.

The control electronics 91 are also conventional in design and amplify the output signal received from the sensor electronics 90. The control electronics 91 includes additional circuitry (e.g., delay logic, control logic) to operate remote apparatus such as alarms, valves, pumps, etc., e.g., to adjust the level of liquid within a container. Preferred control electronics and sensor electronics are manufactured by AM Sensors, Inc., of Salem, N.H.

For a "transparent" sight gauge or similar liquid level device (e.g., a "through glass") where the surface opposite the window includes a second window; in other words, where a non-metallic, non-conductive surface is present opposite from the window, a "reflex" glass 38 with refracting grooves 104 (see e.g., FIG. 3) is used on the sensor side of the liquid level gauge to diffuse the direction of the transmitted microwave energy so that the reflected energy created by the glass-to-air mismatch at surface 104 (or glass-to-liquid mismatch if the liquid level has risen high enough) is not reflected back to the receiver. Otherwise, the reflected energy from an "ungrooved" surface would cause the sensor electronics to receive a reflection without "looking" across the sightglass chamber 41, and falsely detect the absence of liquid at the set height. It is believed that even in the case where a non-metallic, non-conductive surface is opposite from the first window, at least a portion of the transmitted microwave signal would be reflected back through the first window by virtue of the liquid/second window interface, and that if the gain on the receiver is adjusted accordingly detection of the liquid level will occur as explained previously for the "reflex" gauge. Additionally, a reflective coating, for example, a metallic mesh (not shown) can be applied to the outer surface of the second window so as to enhance the amount of energy returned to the receiver when the level of the liquid is lower than the sensing level. In any case, the sensor described above can provide an indication of the liquid level in a wide variety of commercially available liquid level devices.

Alternatively, it is also believed that in the case of a "through glass", also known as a "transparent" gauge, the transmitter and receiver could be included in separate sensors (not shown). The transmitter sensor could, for example, be mounted to one side (e.g., the front) of the "through glass" to direct microwave energy through the first window, while a receiver sensor could be mounted on the other side (e.g., the rear) of the "through glass" to receive the microwave energy directed through the second window. Each transmitter and receiver sensor would then be electrically connected to the sensor electronics described previously.

Figure 7:
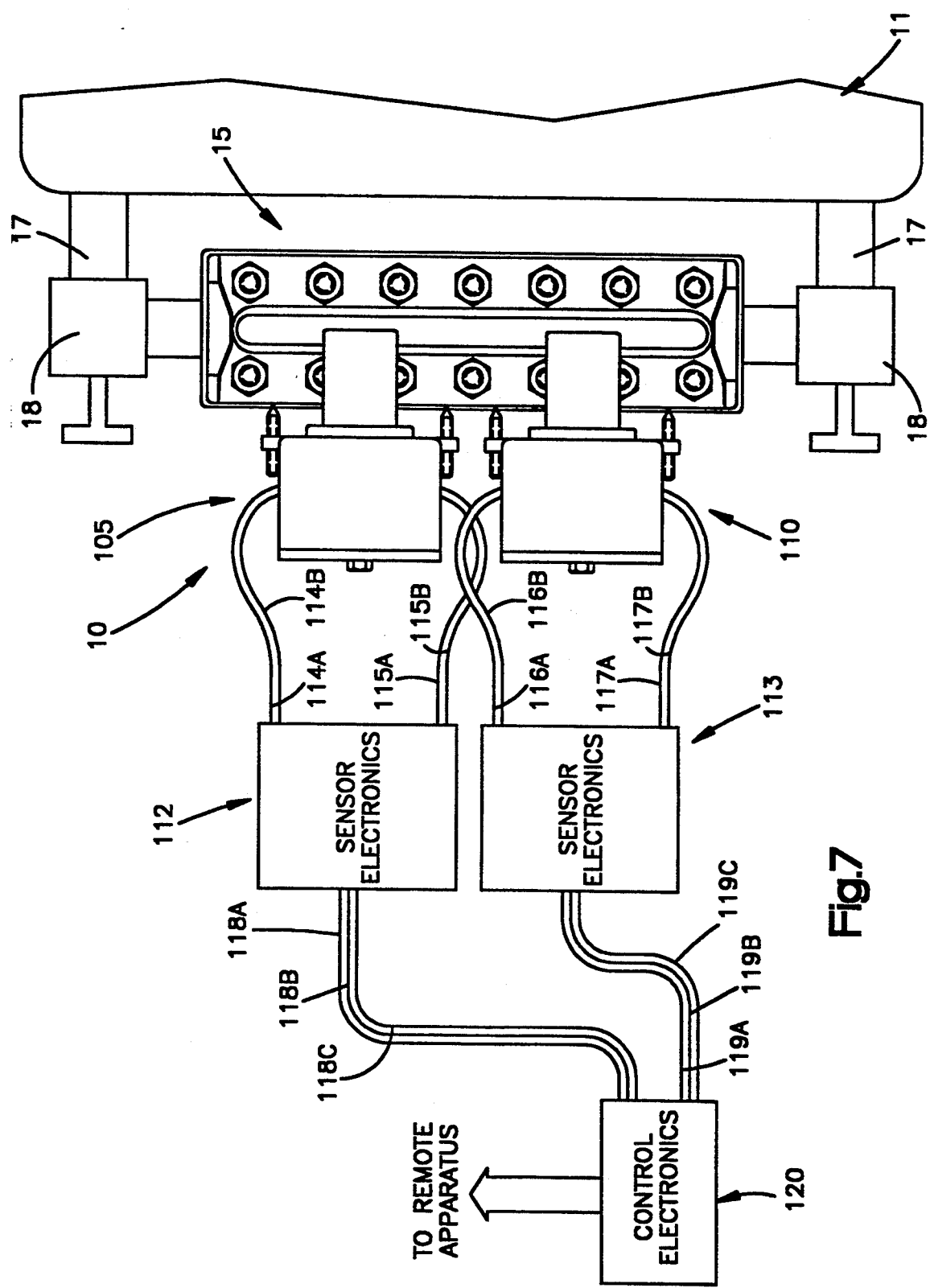
FIG. 7 is a schematic illustration of the liquid level monitoring system similar to FIG. 1, but showing a pair of sensors mounted to the liquid level gauge.

According to an additional aspect of the present invention, additional sensors having transmitter and receiver combinations of the type described herein can be mounted at other selected vertical locations along the liquid level device. The other sensor(s) provide additional indications of other selected liquid levels within the device. For example, a pair of sensors, indicated generally at 105, 110 in FIG. 7, could be mounted at selected vertical locations along the length of the liquid level device. Either the adjustable screw assembly 81A as illustrated in FIGS. 1, 2 and 4, or the clamp assembly 87B as illustrated in FIGS. 3, 5 and 6, can be used to removeably mount each sensor to the liquid level device. For simplicity and clarity of understanding, the same reference numerals will be used for the liquid level device 15 and the tank 11 as were used previously.

The transmitter/receiver combinations in sensors 105, 110 are connected to sensor electronics 112, 113, respectively. More particularly, conductors 114A, 114B, and 115A, 115B connect the transmitter/receiver combination in sensor 105 with sensor electronics 112; while conductors 116A, 116B, and 117A, 117B connect the transmitter/receiver combination in sensor 110 with sensor electronics 113. Sensor electronics 112 are also electrically connected to control electronics 120 via conductors 118A, 118B; while sensor electronics 113 are connected to control electronics 120 via conductors 119A, 119B to provide a ground and 10 volt power to the respective sensor electronics. Again, for purposes of illustration, sensor electronics 112, 113 are shown separate from their respective electronics housings, however, in practice they will be enclosed within their respective sensor housings on conventional circuit boards. The output of the sensor electronics 112, 113 are, in turn, connected by conductors 118C and 119C, respectively, to control electronics 120 to provide remote operation of apparatus such as alarms, valves, pumps, etc.

In this aspect of the invention, the control electronics can include logic relays which activate/deactivate the remote apparatus after the liquid level rises to or above the level of the upper sensor 105, and deactivate/activate the remote apparatus when the liquid falls below the level of the lower sensor 110. Possible variations of activating and deactivating the remote apparatus at different liquid levels should be apparent to those skilled in the art. In any case, the sensors can be mounted to the liquid level device at any selected location along the height of the liquid level device without disturbing the operation of the liquid level device or attached fluid systems while allowing simultaneous visual inspection of the liquid level in the device—even at the level of the sensors. Accordingly, as described herein, the present invention provides a point liquid level monitoring system which can be simply and efficiently mounted (or adjustably moved, removed, serviced, and/or replaced) on a liquid level device without draining, depressurizing, or otherwise disturbing the liquid level device or attached fluid systems to determine the level of liquid within the fluid system.

The invention has been described with respect to certain preferred embodiments. However, it is believed that certain modifications can be made to the invention which will be known to those skilled in the art. For example, it is believed that the sensor could be easily modified to attach to other types of liquid level devices, such as sight flow indicators, sight gauges and sight windows.

More particularly, as shown in FIG. 8, the sensor 47 can be mounted to a sight gauge or sight window, indicated generally at 120, using the same principles outlined above. In mounting the sensor to the sight gauge or sight window, the neck portion 60 of the sensor is initially inserted within an aperture 122 formed in the cover 124 of the device. If the adjustable screw assembly 81A illustrated in FIGS. 1, 2 and 4 is used, the screws 81B are then tightened against the side 126 of the cover 124 to direct the microwave signal through a window 128 (which may or may not be optically transparent) in the liquid level device. Alternatively, if the clamp assembly 87B illustrated in FIGS. 3, 5 and 6 is used, then screw 89B is tightened down to force pin 88B against the side 126 of the cover 24. In any case, the signal is reflected off a surface 30 mounted at the back surface of the liquid level device, collected by the receiver, and compared to the predetermined threshold level. It is believed that additional modifications of the present invention will become apparent to those of ordinary skill in this art.

What is claimed is:

1. A system for monitoring a point liquid level comprising:
   a liquid level device having liquid in a cavity thereof and having a window which is transparent to microwaves,
   a microwave transmitter contained in a housing mounted to the liquid level device at a predetermined level to direct a microwave signal through the window and into the cavity in the device,
   a reflector located on a side of said cavity opposite said window for reflecting said microwave signal, and
   a receiver contained in said housing to receive the reflected microwave signal through the window, the microwave signal being attenuated between said transmitter and said receiver when liquid is present in the cavity at or above the predetermined level and not attenuated between said transmitter and receiver when liquid is absent in the cavity at the predetermined level, thereby to provide a continuous means of monitoring whether or not liquid is present at such predetermined level based upon whether or not the microwave signal is attenuated when received.

2. A system for monitoring a point liquid level comprising:
   a liquid level device having liquid in a cavity thereof and having a window which is transparent to microwaves and normally allows visual observation of the liquid in the liquid level device,
   a microwave transmitter mounted to the liquid level device at a predetermined level to direct a microwave signal through the window and into the cavity in the device, and
   a receiver mounted to the liquid level device at the predetermined level to receive the microwave signal through the window, such that the microwave signal from the transmitter is reflected off a surface on the liquid level device opposite from the window and directed back through the window to be received by the receiver, the microwave signal being attenuated between said transmitter and said receiver when liquid is present in the cavity at or above the predetermined level and not attenuated between said transmitter and receiver when liquid is absent in the cavity at the predetermined level, thereby to provide a continuous means of monitoring whether or not liquid is present at such predetermined level based upon whether or not the microwave signal is attenuated when received, and
   wherein said transmitter and receiver are included within a sensor, and said sensor has a base with at least one adjustment screw and a neck portion, said neck portion being located within an aperture formed in the liquid level device and adapted to direct the microwave signal through the microwave transparent window, and said at least one adjustment screw being located adjacent an outer surface of the liquid level device and being adjustable to removably mount said sensor to the liquid level device.

3. A system as in claim 2, wherein said sensor has the configuration of a C-shaped clamp, the C-shaped clamp configuration enabling the sensor to be removably mounted to the liquid level device.

4. A system as in claim 3, wherein said neck portion includes a lip at the distal end thereof designed to engage a gasket in the liquid level device to assist in removeably mounting the sensor to the liquid level device.

5. A system as in claim 4, wherein said sensor includes a housing enclosing said transmitter and receiver, said housing including waveguide channels having a configuration to direct the microwave signal from the transmitter through the substantially microwave transparent window in the device and into the cavity in the device, and to direct the reflected microwave energy received through the window to the receiver.

6. A system as in claim 5, wherein the liquid level device comprises a liquid level gauge.

7. A system as in claim 5, wherein the liquid level device comprises a sight window or a sight flow indicator.

8. A system as in claim 5, wherein said transmitter waveguide channel in said housing is located in vertically offset relation along said window with respect to said receiver waveguide channel.

9. A system for monitoring a point liquid level comprising:
   a liquid level device having liquid in a cavity thereof and having a window which is transparent to microwaves and normally allows visual observation of the liquid in the liquid level device,
   a microwave transmitter mounted to the liquid level device at a predetermined level to direct a microwave signal through the window and into the cavity in the device, and
   a receiver mounted to the liquid level device at the predetermined level to receive the microwave signal through the window, such that the microwave signal from the transmitter is reflected off a surface on the liquid level device opposite from the window and directed back through the window to be received by the receiver, the microwave signal being attenuated between said transmitter and said receiver when liquid is present in the cavity at or above the predetermined level and not attenuated between said transmitter and receiver when liquid is absent in the cavity at the predetermined level, thereby to provide a continuous means of monitoring whether or not liquid is present at such predetermined level based upon whether or not the microwave signal is attenuated when received, and
   wherein said transmitter and receiver are included within a sensor, and said sensor includes a clamp assembly having a pivotable clamp plate and a neck portion, said neck portion being located within an aperture formed in the liquid level device, and said pivotable clamp plate being located adjacent an outer surface of the liquid level device and being pivotally adjustable to removably mount said sensor to the liquid level device.

10. A system as in claim 9, wherein said pivotable clamp plate includes an adjustment screw and a contact portion, said adjustment screw being selectively adjustable to pivotally force said contact portion of said clamp plate into an engaging relation with the outer surface of the liquid level device to removeably mount said sensor to the liquid level device.

11. A system as in claim 10, wherein said neck portion includes a lip at the distal end thereof designed to engage a gasket in the liquid level device to assist in removeably mounting said sensor to the liquid level device.

12. A system for monitoring a point liquid level in a liquid level device, comprising:
a microwave transmitter contained in a housing mounted to the liquid level device at a predetermined level to direct a microwave signal through a window substantially transparent to microwaves in the device and into a cavity in the device,
a reflector located on a side of said cavity opposite said window for reflecting said microwave signal, and
a receiver contained in said housing to receive the reflected microwave signal, the microwave signal being attenuated between said transmitter and said receiver when the liquid is present in the cavity at or above the predetermined level and not attenuated between said transmitter and receiver when the liquid is absent in the cavity at the predetermined level, the microwave transmitter and receiver being included within a sensor, said sensor being removably mounted to the liquid level device and having a configuration to allow simultaneous visual inspection of the liquid level through said window at any level of the window within the liquid level device.

13. A system as in claim 12, further including a second transmitter and receiver pair mounted to the liquid level device at a second predetermined level to direct a second microwave signal through said window and receive the second microwave signal, the second microwave signal being attenuated between said second transmitter and receiver pair when liquid is present in the liquid level device at or above said second predetermined level, and not attenuated between said second transmitter and receiver pair when liquid is absent in the cavity at said second predetermined level.

14. A system as in claim 12, wherein said system further includes sensor electronics to compare the received signal with a predetermined threshold value, said sensor electronics providing a first output signal to control electronics when liquid is present at or above the predetermined level, and a second output signal to the control electronics when liquid is absent at the predetermined level, said control electronics being designed to selectively actuate remote apparatus depending on whether the first or second output signal is received from the sensor electronics.

15. The system of claim 12, wherein said microwave transmitter outputs said microwave signal at a level of power of approximately one milliwatt (mW).

16. The system of claim 12, wherein said microwave transmitter outputs said microwave signal at a level of power of approximately one milliwatt (mW).

17. A sensor designed to be mounted at a preselected level to a liquid level device, the liquid level device having a window which is substantially transparent to microwaves and normally allows visual observation of the liquid in the liquid level device, said sensor comprising:
a first waveguide having a configuration to direct a microwave signal through the window and into a cavity in the liquid level device,
a reflector located on a side of said cavity opposite said window for reflecting said microwave signal,
a second waveguide having a configuration to collect the reflected microwave signal received through the window in the liquid level device, the microwave signal being attenuated between said first and second waveguides if liquid is present in the liquid level device at or above the preselected level, and not attenuated if liquid is absent at the preselected level,
a microwave transmitter to transmit the microwave signal through said first waveguide, and
a microwave receiver to receive the reflected microwave signal through said second waveguide, Said transmitter and said receiver contained within a single housing, thereby to provide a continuous means of monitoring whether or not liquid is present at such predetermined level based upon whether or not the microwave signal is attenuated when received.

18. A sensor as in claim 17, wherein said sensor has the configuration of a C-shaped clamp, the C-shaped clamp configuration enabling the sensor to be removably mounted to the liquid level device.

19. A sensor as in claim 17, wherein said sensor has a configuration which allows simultaneous visual inspection of the liquid level through said window at any level of the window within the liquid level device when said sensor is mounted to the liquid level device.

20. A sensor as in claim 19, wherein said first and second waveguides are located in said sensor in such a manner that when the sensor is mounted to the liquid level device, said first and second waveguides direct and collect the microwave signal from a location which is opposite from said reflective surface.

21. The sensor of claim 17, wherein said microwave transmitter outputs said microwave signal at a level of power of approximately one milliwatt (mW).

22. A sensor designed to be mounted at a preselected level to a liquid level device, said sensor comprising:
a first waveguide having a configuration to direct a microwave signal through a window substantially transparent to microwaves and into a cavity in the liquid level device, the microwave signal from the transmitter being reflected off an internal surface in the liquid level device and directed back through the window, and
a second waveguide having a configuration to collect the reflected microwave signal received through the window in the liquid level device, the microwave signal being attenuated between said first and second waveguides if liquid is present in the liquid level device at or above the preselected level, and not attenuated if liquid is absent at the preselected level,
a microwave transmitter to transmit the microwave signal through said first waveguide, and
a microwave receiver to receive the reflected microwave signal through said second waveguide,
said sensor having a base with adjustment screws and a neck portion, said adjustment screws being located adjacent an outer surface of the liquid level device and said neck portion being located within an aperture formed in the liquid level device and adapted to direct the microwave signal through the substantially microwave-transparent window, said screws being adjustable to removably mount said sensor to the liquid level device.

23. A sensor as in claim 22, wherein said neck portion includes a lip at the distal end thereof designed to engage a gasket in the liquid level device to assist in removably mounting the sensor to the liquid level device.

24. A sensor as in claim 23, wherein said sensor includes a housing enclosing said transmitter and receiver, said housing including waveguide channels having a configuration to direct the microwave signal from the transmitter through the substantially microwave-transparent window in the device and into the cavity in the device, and to direct the reflected microwave energy received through the window to the receiver.

25. A sensor designed to be mounted at a preselected level to a liquid level device, said sensor comprising:
   a first waveguide having a configuration to direct a microwave signal through a window substantially transparent to microwaves and into a cavity in the liquid level device, the microwave signal from the transmitter being reflected off an internal surface in the liquid level device and directed back through the window, and
   a second waveguide having a configuration to collect the reflected microwave signal received through the window in the liquid level device, the microwave signal being attenuated between said first and second waveguides if liquid is present in the liquid level device at or above the preselected level, and not attenuated if liquid is absent at the preselected level,
   a microwave transmitter to transmit the microwave signal through said first waveguide, and
   a microwave receiver to receive the reflected microwave signal through said second waveguide,
   said sensor including a clamp assembly having a pivotable clamp plate and a neck portion, said neck portion being located within an aperture formed in the liquid level device, and said clamp plate being located adjacent an outer surface of the liquid level device and being pivotably adjustable to removably mount said sensor to the liquid level device.

26. A sensor as in claim 25, wherein said clamp plate includes an adjustment screw and a contact portion, said adjustment screw being selectively adjustable to pivotably force said contact portion of said clamp plate into an engaging relation with the outer surface of the liquid level device to removably mount said sensor to the liquid level device.

27. A sensor as in claim 26, wherein said neck portion includes a lip at the distal end thereof designed to engage a gasket in the liquid level device to assist in removably mounting the sensor to the liquid level device.

28. A mounting assembly for mounting a monitoring device to a liquid level device, comprising:
   a clamp plate pivotably attached to the monitoring device, and a neck portion extending outwardly from the monitoring device and being configured to be located within an aperture formed in the liquid level device when said clamp plate is located proximate to an outer surface of the liquid level device, said clamp plate being pivotably adjustable into an engaging relation with the outer surface of the liquid level device to removeably mount the monitoring device to the liquid level device.

29. A mounting assembly as in claim 28, wherein said clamp plate includes an adjustment screw and a contact portion, said adjustment screw being selectively adjustable to pivotably force said contact portion of said clamp plate into an engaging relation with the outer surface of the liquid level device to removeably mount the device to the liquid level device.

30. A mounting assembly as in claim 29, wherein said neck portion includes a lip at the distal end thereof designed to engage a gasket in the liquid level device to assist in removeably mounting the device to the liquid level device.

31. A system for monitoring a point liquid level in a liquid level device, comprising:
   a sensor enclosing a microwave transmitter to direct a microwave signal through a window in the liquid level device substantially transparent to microwaves and into a cavity in the device, and a microwave receiver to receive the microwave signal, and
   a mounting assembly for mounting the sensor at a predetermined level on the liquid level device, said mounting assembly having a clamp plate pivotably attached to the sensor, and a neck portion extending outwardly from the sensor and being configured to be located within an aperture formed in the liquid level device when said clamp plate is located proximate to an outer surface of the liquid level device, said clamp plate being pivotably adjustable into an engaging relation with the outer surface of the liquid level device to removeably mount the sensor to the liquid level device at the predetermined level, the microwave signal being attenuated between said transmitter and said receiver when liquid is present in the cavity at or above the predetermined level and not attenuated between said transmitter and receiver when liquid is absent in the cavity at the predetermined level.

32. A system for monitoring a point liquid level in a liquid level device comprising:
   a liquid level device having a chamber defining a cavity for liquid, a cover attached to the chamber, and a window substantially transparent to microwaves interposed between said cover and said chamber, said cover defining an aperture to enable visual observation through said window of the liquid in the liquid level device,
   a sensor comprising a microwave transmitter and receiver mounted to the liquid level device at a predetermined level to direct a microwave signal through the window and into a cavity in the chamber and to receive the microwave signal, the microwave signal being attenuated between said transmitter and said receiver when the liquid is present in the cavity at or above the predetermined level and not attenuated between said transmitter and receiver when the liquid is absent in the cavity at the predetermined level,
   said sensor including a housing enclosing said microwave transmitter and receiver, and a neck portion extending into said aperture, said neck portion including microwave waveguides to direct the microwave signal from said transmitter and to direct the microwave signal to the receiver, said neck portion also cooperating with said housing to removably mount said sensor to the liquid level device.

33. A system as in claim 32, wherein said sensor housing has a base with at least one adjustment screw, said at least one adjustment screw being located adjacent an outer surface of the liquid level device and being adjustable to removably mount said sensor to the liquid level device.

34. A sensor as in claim 32, wherein said chamber includes a microwave reflective surface opposite from the window which reflects the microwave signal from the transmitter to the receiver; and said transmitter and receiver are both mounted to the liquid level device at a location which is opposite from said reflective surface.

35. A system as in claim 32, wherein said neck portion has a configuration which only partially obscures said window at the predetermined level and allows simultaneous visual observation of the liquid level through the window at any level of the window within the liquid level device.

36. A system as in claim 32, wherein said system further includes electronic means for providing an indication of when liquid is present in the liquid level device at the predetermined level.

* * * * *